(No Model.)
W. H. ADAMS.
TRIPOD FOR ROCK DRILLS.
No. 421,468. Patented Feb. 18, 1890.
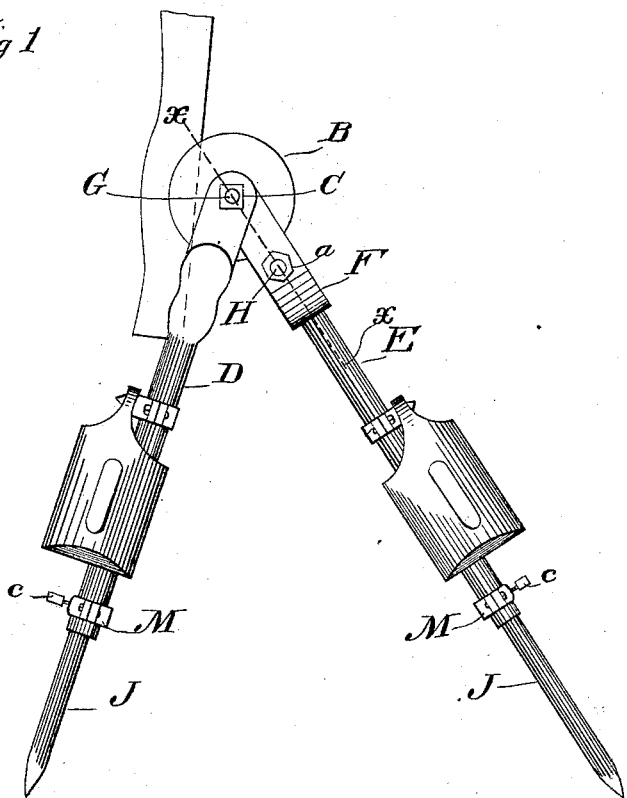
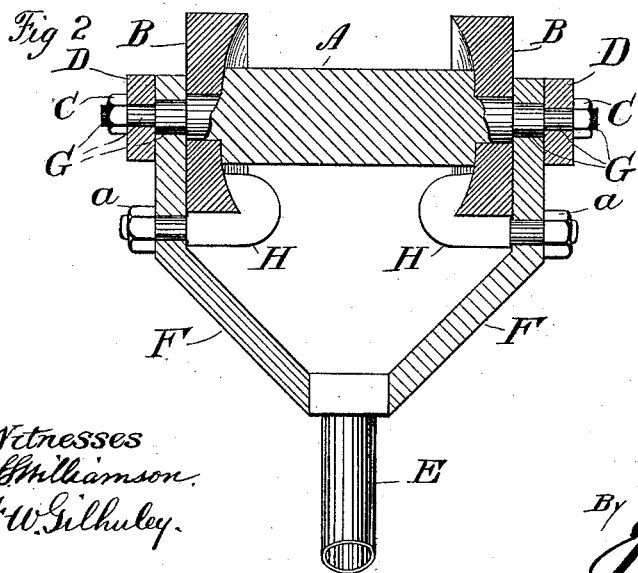
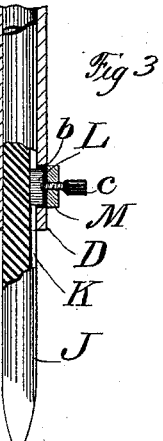
Witnesses
S. Williamson.
F. W. Gilhuley.
Inventor
Walter H. Adams
By 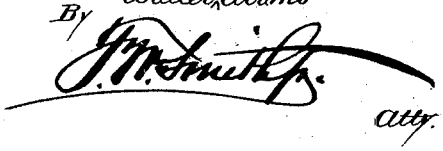
Atty.

UNITED STATES PATENT OFFICE.

WALTER H. ADAMS, OF STAMFORD, CONNECTICUT.

TRIPOD FOR ROCK-DRILLS.

SPECIFICATION forming part of Letters Patent No. 421,468, dated February 18, 1890.

Application filed May 23, 1889. Serial No. 311,803. (No model.)

*To all whom it may concern:*

Be it known that I, WALTER H. ADAMS, a citizen of the United States, residing at Stamford, in the county of Fairfield and State of Connecticut, have invented certain new and useful Improvements in Tripods for Rock-Drills; and I do hereby declare the following to be a full, clear, and exact description of the invention, such as will enable others skilled in the art to which it appertains to make and use the same.

My invention has reference to certain new and useful improvements in tripods for steam rock-drills, and has for its object to provide a support for the drill which shall be ready of adjustment and exceedingly firm when in use; and with these ends in view my invention consists in the details of construction and combination of parts, such as will be hereinafter fully set forth, and specifically designated by the claims.

In the accompanying drawings, Figure 1 is a side elevation of my improved tripod; Fig. 2, an enlarged detail section taken at the line $xx$ of Fig. 1, and showing particularly the manner of adjusting the position of the legs; and Fig. 3, an enlarged detail broken section through one of the legs, and showing especially the manner of adjusting the points within the legs.

Similar letters denote like parts in the several figures of the drawings.

A is the usual cross-pin for supporting the operating mechanism of the rock-drill. I will not enter into any description of such mechanism, since it forms no part of my present invention, and I have therefore omitted it from my drawings.

B are cheek-plates rigidly secured to or integral with the cross-pin at its extremities. The inner faces of these plates are concaved for the purpose presently explained.

E is the rear leg of my tripod, and D are the forward legs thereof, only one of the latter being visible in the elevation shown at Fig. 1. The upper extremity of the leg E is yoked, as seen at F, while the legs D are outside of this yoke and are, together with the latter, pivoted around hubs G, extending from each end of the pin A. A nut C is run on the extremities of these hubs, whereby the yokes and legs may be secured in their above-named relative position. H are hook-bolts, the inner ends whereof are closely conformed to the dished faces of the plates B, the outer ends of said bolts being passed through the respective members of the yoke F and threaded to accommodate nuts $a$. The manipulation of these nuts binds the bolts H firmly to the cheek-plates B to firmly hold the leg E in any desired adjustment, or, vice versa, releases the bolt so as to permit the leg E to be readily swung to any position.

The legs D E are hollow, as in ordinary rock-drills, but are provided near their lower extremities with lateral openings $b$. The points J fit within the legs and have within their shanks a V-groove K, which shallows toward the lower end.

L is a key fitting within the opening $b$, and having its inner end conformed in cross-section to the groove K.

M is a collar around the leg and $c$ a set-screw through said collar and bearing directly against the key L, whereby the latter may be clamped against the shank of the point to bind the same securely in any desired extension. The peculiar shape of the groove in the shank shallowing toward the lower end renders it a very simple matter to extend the point, since by merely lifting the leg the point will drop by gravity and the setting of the key will prevent the point from being thrown back into the leg when the latter is released. In shortening a leg, the set-screw $c$ is backed until the required adjustment is effected, this being automatically accomplished since the gravity drop of the leg when the set-screw $c$ is loosened will cause the key to be advanced within the shallowing groove, but with a constant binding after the manner of a wedge.

I claim—

1. In a tripod for rock-drills, a cross-pin having rigid therewith at each end cheek-plates having concaved inner faces, in combination with the yoked rear leg, and hook-bolts passed through the latter and holding against said faces, substantially as set forth.

2. The extensible leg having cut therein a groove longitudinal thereof and shallowing by a regular incline from the upper toward the lower end, in combination with the key fitting within an opening in the hollow leg, the collar surrounding the leg, and the set-screw passed through the collar and bearing against the key, substantially as set forth.

In testimony whereof I affix my signature in presence of two witnesses.

WALTER H. ADAMS.

Witnesses:
F. W. GILHULEY,
S. S. WILLIAMSON.